United States Patent [19]
Takashino

[11] 3,877,073
[45] Apr. 8, 1975

[54] CASSETTE TAPE RECORDING AND REPRODUCING APPARATUS WITH LEAF-SPRING HOLD-DOWN MEANS

[75] Inventor: Shizuo Takashino, Tokorazawa, Japan

[73] Assignee: Sony Corporation, Tokyo, Japan

[22] Filed: July 21, 1972

[21] Appl. No.: 273,769

Related U.S. Application Data

[63] Continuation-in-part of Ser. No. 34,722, May 5, 1970, Pat. No. 3,743,299.

[30] Foreign Application Priority Data

May 9, 1969 Japan .......................... 44-42005[U]
May 9, 1969 Japan .......................... 44-42006[U]

[52] U.S. Cl. .................................... 360/96; 360/105
[51] Int. Cl. ............................................ G11b 5/54
[58] Field of Search .............................. 360/105, 96

[56] References Cited

UNITED STATES PATENTS 3,743,299 7/1973 Takashino .......................... 274/4 C
3,820,158 6/1974 Schober ............................. 360/105

*Primary Examiner*—Bernard Konick
*Assistant Examiner*—Robert S. Tupper
*Attorney, Agent, or Firm*—Lewis H. Eslinger; Alvin Sinderbrand

[57] ABSTRACT

In a tape recording and reproducing apparatus having a support and ejection device for a tape cassette and a carriage supporting a head and being movable from an inactive station to a recording and reproducing station, the support and ejection device includes a pair of shouldered support blocks adjacent the recording and reproducing station which are adapted to support a first edge portion of a tape cassette at a predetermined level with respect to the head; the cassette is urged into engagement with the shouldered portions of the support blocks by a first resilient member engaging the edge portion thereof which is opposite the first mentioned edge portions and is held on the shouldered support blocks by a second resilient member fixed and movable therewith for extending over and bearing downwardly on said first mentioned edge portion of the cassette when the carriage is at said recording and reproducing station. When the carriage is moved to its inactive position, the second resilient member is withdrawn from the cassette so that the latter can be lifted from the support blocks to facilitate removal from the apparatus by a pivotally mounted platform operatively connected to an actuator system for movement from a first position below the level at which the cassette is normally supported to a second position which is elevated with respect to the recording and reproducing station.

3 Claims, 7 Drawing Figures

CASSETTE TAPE RECORDING AND REPRODUCING APPARATUS WITH LEAF-SPRING HOLD-DOWN MEANS

This application is a continuation-in-part of my copending U.S. Pat. application Ser. No. 034,722, filed May 5, 1970, now U.S. Pat. No. 3,743,299, and having a common assignee herewith.

This invention relates generally to tape cassette recording and reproducing apparatus, and more particularly to a cassette supporting and ejecting device for such apparatus.

Tape cassette support and ejection devices of the above type have previously been proposed which utilize a plurality of support members on which a tape cassette is seated to maintain a predetermined positional relationship with respect to the head of the apparatus during recording and/or reproducing. Typically, a pair of cylindrical support members having downwardly tapered upper portions extending from upwardly facing annular shoulders are provided adjacent the recording and reproducing station and are adapted to be inserted in circular apertures provided in the cassette. The shoulders of the pins support the cassette at the desired predetermined level. However, the cassette is free to move laterally on the support shoulders since the diameter of the cassette apertures must be larger than the diameter of the tapered upper sections of the pins in order for the pins to be properly inserted within the cassette. As a result, the cassette is not held firmly in the desired positional relationship with the head, but is free to move laterally with respect to the head when the apparatus is operated, thus causing undesirable signal distortions. This is a particular problem in cassette recording and/or reproducing apparatus of the portable type wherein the cassette is more likely to be subjected to movement during recording and reproducing. In addition, due to the tapered design of the previously used support pins, the cassette is difficult to remove from the apparatus after use since, as the cassette is moved away from the shouldered support members, the apertures are fully engaged by the widening tapered portions of the pin and a substantial resistance to movement of the cassette is thereby produced.

It has also been proposed, particularly in my copending U.S. Pat. No. 3,743,299, identified more fully above, that a tape cassette recording and reproducing apparatus having a carriage supporting a head, and which is movable from an inactive station to a recording and/or reproducing station, should be provided with a support and ejection device for a tape cassette including a plurality of support members two of which are in the form of blocks positioned adjacent the recording and reproducing station and having shouldered portions adapted to receive and support an edge portion of the cassette at a predetermined level with respect to the head. A resilient member has a cam surface adapted to engage the top edge of the cassette which is opposite to the edge portion seated on the support blocks and urges the cassette against the shouldered portions of the support blocks to hold the cassette in engagement therewith and maintain the predetermined positional relationship of the cassette with the head at the recording and reproducing station. In addition, a pair of spring biased hold-down arm members are pivotally mounted on the carriage in association with the shouldered support blocks and are urged into engagement with their respective blocks when the carriage is at the inactive station; the hold-down arm members moving along the support blocks in response to movement of the carriage from the inactive station to the recording and/or reproducing station to engage the top surface of the cassette at the recording and reproducing station and hold the cassette on the shouldered portions of the support blocks in the desired predetermined positional relationship with the head. Upon completion of a recording or reproducing operation, the carriage is returned to its inactive position and consequently withdraws the spring-biased, hold down arm members from over the edge portion of the cassette, whereupon the cassette may be ejected from the device by a lifting member which is mounted in the apparatus for movement from a first position below the cassette support members to a second position which is elevated with respect to the recording and/or reproducing station.

The last described tape cassette support and ejection device for a tape recording and/or reproducing apparatus assures the maintenance of a predetermined positional relationship between the casette and the head of the apparatus at the recording and/or reproducing station, and thereby avoids distortion, particularly in a portable apparatus. However, the hold-down arm members pivoted on the carriage and spring urged to bear downwardly on the cassette when engaged with the latter, serve to undesirably increase the cost and the complexity of the cassette support and ejection device.

Accordingly, it is an object of the present invention to provide a tape cassette support and ejection device for a tape recording and/or reproducing apparatus which also functions to securely maintain a predetermined positional relationship between the cassette and the magnetic head at the recording and/or reproducing station, and which is relatively simple in construction to facilitate the assembly and reduce the cost of such device.

Another object is to provide a device, as aforesaid, which has a reduced number of moving parts for ensuring a long and trouble-free useful life.

In accordance with an aspect of this invention, the previously mentioned spring-biased hold-down arm members pivoted on the carriage are replaced by a resilient member, for example, of spring-metal, simply secured or fixed on the carriage for extending over, and bearing down on the edge portion of the cassette supported on the shouldered portions of the support blocks when the carriage is moved to the recording and/or reproducing station.

The above, and other objects, features and advantages of this invention, will be apparent in the following detailed description of an illustrative embodiment thereof which is to be read in connection with the accompanying drawings, wherein.

Figure 1:
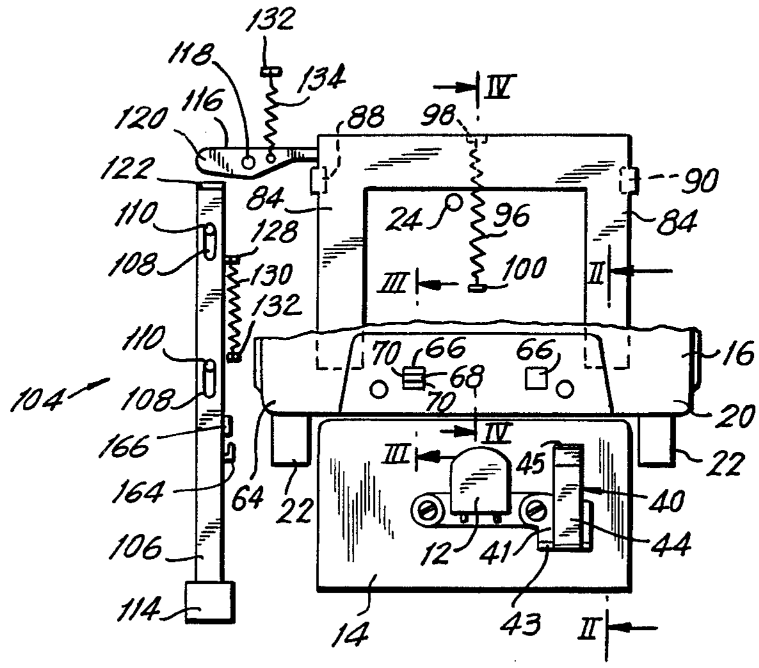
FIG. 1 is a top plan view of a cassette support and ejection device according to an embodiment of the presnt invention, wherein the head carrying carriage is shown at its inactive station and a portion of the cassette is broken away for clarity.
Figures 5, 6:
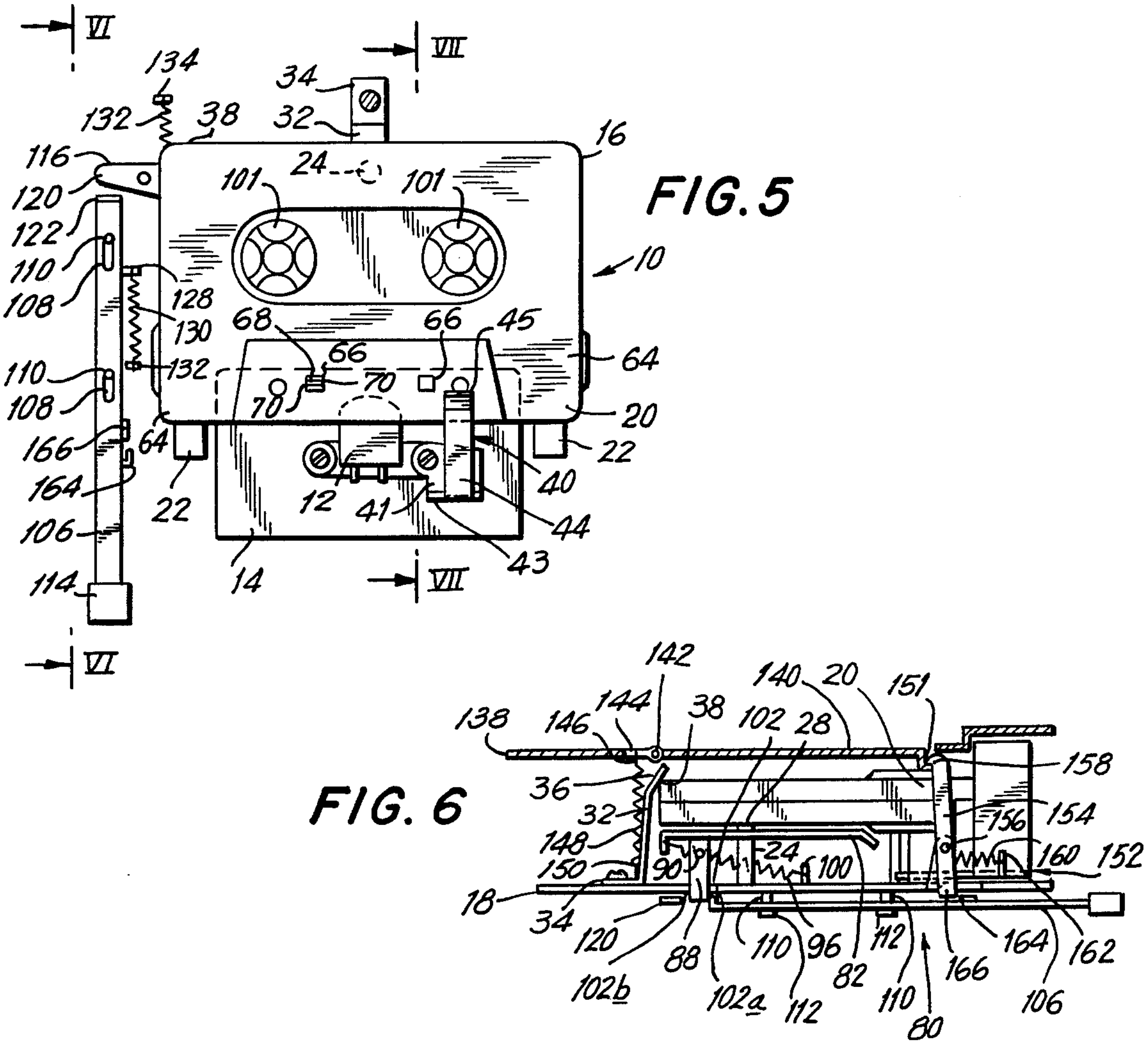
FIG. 5 is a plan view similar to FIG. 1, but with the head carrying carriage at its recording or reproducing station.
FIG. 6 is a side view taken on line VI—VI of FIG. 5.

Referring to the drawings in detail, and initially to FIGS. 1 and 5 thereof, it will be seen that the tape cassette recording and/or reproducing apparatus 10 embodying the present invention, as shown therein, comprises at least a magnetic recording and reproducing head 12 mounted on a carriage 14 for movement between an inactive station (FIG. 1), wherein head 12 is remote from a cassette 16, and a recording and reproducing station (FIG. 5), wherein head 12 is operably engaged with the magnetic recording tape within cassette 16 for recording or reproducing information thereon. Carriage 14 supports, in addition to head 12, an erase head and capstan (not shown) and is mounted upon a relatively flat base plate 18 for reciprocal movement between the inactive station and the recording and reproducing station in response to actuation of playback and record controls in the apparatus which are not shown since they form no part of the present invention and moreover may be of conventional construction.

Cassette 16 is adapted to be supported with its edge portion 20 adjacent the recording and reproducing station by a three-point support system including a pair of support blocks 22 and a support pin 24 each of which is mounted on base plate 18. Support blocks 22 are positioned adjacent the recording and reproducing station and each is formed with a shouldered portion 26 which is adapted to receive and support edge portion 20 of cassette 16. Shoulders 26 and the upper surface 28 of pin 24, which engages the lower surface of cassette 16, as seen in FIG. 6, each lie in the same horizontal plane and cooperate to support and maintain cassette 16 at a predetermined level with respect to head 12.

As seen in FIGS. 1 and 5, carriage 14 is moved from the inactive station to the recording and reproducing station between support blocks 22 which further include vertically extending surfaces 30 adjacent shouldered portions 26 and against which edge portion 20 of cassette 16 abuts, thereby to define the location of the recording and reproducing station and assure operative engagement between head 12 and the tape (not shown) contained within the cassette. Maintenance of engagement of edge portion 20 of cassette 16 against the shoulder 26 and surface 30 of each support block 22 is assisted by a resilient arm 32 which is mounted at its lower end 34 on base plate 18 at a position in the device opposite recording head 12. Arm 32 includes an upper bent tab or cam surface portion 36 which is adapted to engage the top of the edge portion 38 of cassette 16 which is opposite to edge portion 20. Arm 32 with cam surface portion 36 thus engaging cassette 16 urges the cassette toward head 12 and into engagement with vertical surfaces 30 of support blocks 22. Moreover, due to the inclined configuration of surface 36, cassette 16 is also urged downwardly against shoulders 26 and top surface 28 of pin 24 to maintain the predetermined positional relationship between head 12 and the cassette 16 at the recording and reproducing station.

Figure 2:
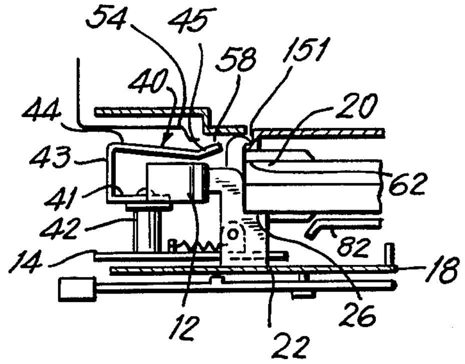
FIG. 2 is a side view taken on line II—II of FIG. 1.
Figure 7:
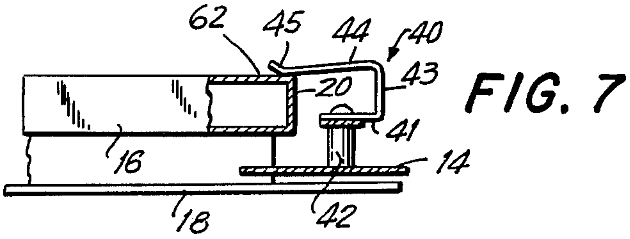
FIG. 7 is a view partly in section taken on line VII—VII of FIG. 5.

In order to assure intimate contact between cassette 16 and shoulders 26 of support blocks 22 and thus assist in maintaining the relatively fixed predetermined positional relationship of the cassette with respect to the head 12, the apparatus 10 according to this invention further includes a resilient member 40, for example, of spring steel or other metal, which is fixed on carriage 14 for extending over, and bearing downwardly on the edge portion 20 of cassette 16 at a lateral location between support blocks 22 upon the movement of carriage 14 to the recording and reproducing station (FIGS. 5 and 7). As shown, resilient member 40 includes a base portion 41 which may be secured on one of the posts 42 supporting head 12 at the desired level on carriage 14. An upright portion 43 extends upwardly from base portion 41 and a leaf-spring arm portion 44 extends from the upper end of portion 43 in the direction of movement of carriage 14 from its inactive position (FIGS. 1 and 2) to its operational or recording and reproducing position (FIGS. 5 and 7). The leaf-spring arm portion 44 preferably is inclined downwardly toward its free end which terminates in an upwardly curved end portion 45. The arm portion 44 is longitudinally dimensioned so that, when carriage 14 is in its inactive position (FIGS. 1 and 2), arm 44 is withdrawn from over the edge 20 of cassette 16 for avoiding interference of member 40 with either the seating or removal of the cassette or shouldered portions 26 of blocks 22. However, the curved end 45 of arm portion 44 is adapted to ride over the top 62 of edge portion 20 of casette 16 as carriage 14 is moved from the inactive station to the recording and reproducing station and thus guide arms 54 into engagement with the cassette. It is thus seen that arm 44 acts downwardly against the top surface 62 of cassette 16 at the recording and reproducing station and cooperates with arm 32 to hold edge portion 20 of the cassette in engagement with surfaces 26 and 30 of support blocks 22 during recording and reproducing operations to maintain the desired predetermined positional relation between cassette 16 and head 12.

Figure 3:
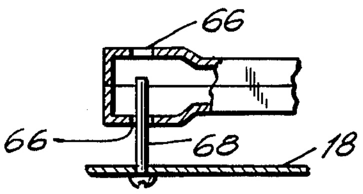
FIG. 3 is a fragmentary sectional view taken on line III—III of FIG. 1.

As seen in FIGS. 1 and 5, cassette 16 may be formed with generally rectangularly shaped apertures 66 which are provided to assure accurate horizontal alignment of cassette 16 with head 12, that is, lateral alignment in the direction of the predetermined level of the cassette with respect to the head. A stud member 68, having a generally rectangular cross-section and being longitudinally tapered in the lateral direction, is mounted on base plate 18 between support blocks 22, and is adapted to be inserted in and frictionally engaged with a selected one of apertures 66, in the manner illustrated in FIGS. 1 and 3. The frictional engagement of the lateral sides 70 of stud 68 with the edges of aperture 66 assures accurate lateral alignment of cassette 16 with respect to head 12 and prevents inadvertent dislodgment or movement of the cassette in this direction during the recording and reproducing operations, thus eliminating distortion due to cassette shifting within the apparatus as occurs in prior art devices wherein the cassette is generally loosely supported on support members such that it may be shifted laterally of the head during operation. In addition, since stud 68 tapers longitudinally in the lateral direction and has a smaller dimension than aperture 66 in the fore and aft direction, the cassette is readily removed from the stud without interference in the manner hereinafter described, and eliminates the difficulties found in prior art devices in removing the cassette from its support structure.

Figure 4:
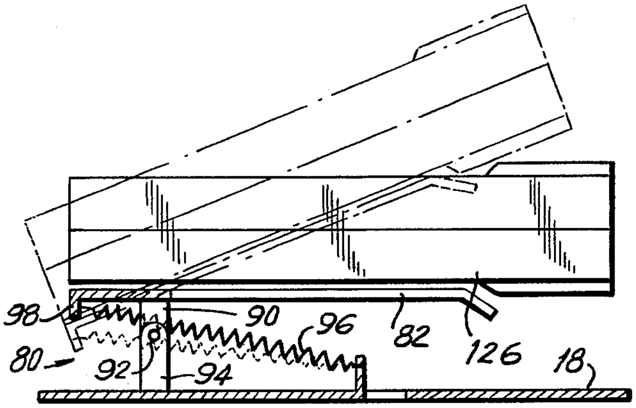
FIG. 4 is a view partly in section taken on line IV—IV of FIG. 1 and showing the ejection support platform and cassette in their raised position in dotted lines.

Upon completion of recording and reproducing operations, carriage 14 and head 12 may be returned to the inactive station (FIG. 1) in a conventional manner, as for example, upon operation of the stop, rewind or fast forward controls, releasing cassette 16 from beneath leaf-spring arm portion 44 whereby the cassette can be removed from support blocks 22 and support pin 24 by an ejection mechanism 80 illustrated in FIGS. 4 and 6.

Ejection or lifting mechanism 80 is shown to include a support platform 82 which is formed as a generally U-shaped member (FIG. 1) having a pair of legs 84 and an interconnecting bight portion 86 located at the rear of the apparatus with respect to head 12. Platform 82 further includes a pair of downwardly extending arms 88 and 90 which are pivotally mounted on a shaft 92 carried by upstanding tabs 94 on base plate 18 to permit movement of platform 82 between a horizontal or first position, illustrated in full lines on FIG. 4, and a raised or second position, illustrated in dotted lines. A resilient member 96, which preferably comprises a tension spring, is connected at its opposite ends on opposite sides of pivot shaft 92 to extension tab 98 on bight 82 and an upstanding tab 100 on base plate 18. The points of connection of spring 96 with platform 82 and base plate 18, are located, as seen in FIG. 4, to urge platform 82 towards its raised position from a midpoint between its horizontal and raised positions when the centerline of the spring is moved to a point above the centerline of shaft 92.

Arm 88 depending from platform 82 is longer than arm 90, and extends downwardly through an aperture 102 in base plate 18. The raised position of platform 82 is defined by engagement of arm 88 with the forward edge 102*a* of aperture 102 against which arm 88 is held by the biasing force of spring 96 which urges platform 82 in the counterclockwise direction, as seen in FIG. 4, about pivot shafts 92 when the platform is in its raised position. Thus platform 82 is held in a stable manner so as to be tiled upwardly away from head 12 for reception of a cassette 16 prior to the recording and reproducing operations. Cassette 16 is thence seated on tilted platform 82 with its rear edge 38 positioned beneath cam surface 36 of arm 32, whereupon the cassette is depressed against the bias of spring 96 so as to be moved with platform 82 towards the horizontal position of platform 82. As spring 96 is moved to a position above the centerline of shaft 92 it will automatically complete movement of platform 82 to its horizontal position which is limited or defined by engagement of arm 88 with the rear edge 102*b* of aperture 102 under the biasing action of spring 96.

In its horizontal position, platform 82 is located below shoulders 26 of support blocks 22 and top surface 28 of pin 24 so that cassette 16 is automatically seated on shoulders 26 and pin surface 28 in its predetermined positional relationship with head 12. In addition, depression of cassette 16 towards the second or horizontal position of platform 82 automatically engages stud 68 in aperture 66 for accurate lateral alignment of the cassette with head 12 and tape reel hubs 101 within cassette 16 are engaged with reel drive spindles (not shown) extending upwardly through base plate 18.

To reverse the process, that is, to initiate pivotal movement of platform 82 from its horizontal position to its raised or tilted position and thereby eject cassette 16 from the recording and reproducing station, an actuator system 104 is provided which includes a slide member 106 having a pair of guide apertures 108 which receive guide members 110 depending from base plate 18 and have enlarged head members 112 to retain slide 106 thereon. Slide 106 has an actuator or finger portion 114 by which the slide may be moved from the position illustrated in FIG. 1 into engagement with a lever 116 which is adapted to engage the end portion of leg 88 and initiate pivotal movement of platform 82 towards its raised position. Lever 116 is pivotally mounted on a pin 118 and has an arm 120 at one end which is engageable by end 122 of slide member 106 upon movement thereof to pivot lever 116 about shaft 118 in a generally clockwise direction (FIG. 1) whereby leg 124 of lever 116 urges leg 88 counterclockwise as seen in FIG. 6 to move the platform 82 towards its raised position. As spring 96 is moved to a position below the centerline of shaft 92 it will be effective to continue the pivotal movement of platform 82 to its raised position, wherein arm 88 again engages edge 102*a*. As platform 82 moves towards its second or raised position it engages the lower surface 126 of cassette 16 to lift the cassette from support blocks 22 and pin 24 and disengage stud 68 from aperture 66 to eject or raise the cassette from the recording and reproducing station. As previously noted, leaf spring arm 44 will already have been disengaged from cassette 16 by movement of carriage 14 to the inactive station on actuation of the stop or rewind controls.

Referring again to FIG. 1, it is seen that slide member 106 is provided with an extension 128 to which is attached one end of a resilient member or spring 130. The opposed end of spring 130 is connected to a tab 132 which also depends from base plate 18, whereby spring 128 will bias slide member 106 to the position shown in FIG. 1 wherein end 122 thereof is disengaged from arm 120 of lever 116 and slots 108 engage studs 110 to limit movement of actuator 106 away from lever 116.

Lever 116 is biased to move its leg 124 out of engagement with leg 88 by a spring 132 which, as seen in FIG. 1, is fixed at one end to leg 124 and, at its opposed end, to tab member 134 which also depends from platform 18.

The support and ejection device previously described is contained within a housing 138 of the recording and reproducing apparatus, and an articulated cover 140 may be provided which is adapted to enclose cassette 16 within the housing when the cassette is positioned at the recording and reproducing station. Cover 140 is pivotally mounted at its rear edge 142 on housing 138 for movement between a horizontal or first position and a raised or second position, which correspond to the horizontal and raised positions, respectively, of platform 82. Rear edge 142 of cover 140 is provided with an extension 144 which is engaged by one end 146 of a tension spring 148 whose opposed end 150 is fixed to base plate 18 to urge or bias cover 140 to its raised position, whereby support platform 82 is exposed to facilitate insertion of a cassette within the device in the manner previously described.

When cassette 16 is depressed against the bias of spring 96 acting on platform 82 and is seated on support blocks 22 and pin 24, cover 140 may be manually depressed to its horizontal position wherein the stepped or shouldered front edge 151 of the cover is engaged by a latching mechanism 152. Latching mechanism 152 includes a latch lever 154 which is pivotally mounted on shaft 156 and has a shouldered end portion or hook 158 adapted to engage front edge 151 of cover 140. As seen in FIG. 6, lever 154 is spring biased into engagement with edge 151 by a spring 160 whose ends are respectively connected to lever 154 and an upstanding tab member 162 on base plate 18 to thereby hold the cover in its horizontal position against the bias of spring 148.

To release hook 158 from edge 151 and thereby release cover 140 to permit ejection of cassette 16, slide member 106 is provided with a tab 164 (FIGS. 1 and 6) which is adapted to engage the lower end 166 of lever 154 so that as slide 106 is moved into engagement with lever 116 to move support platform 82 to its raised or second position, tab 164 will engage lever 154 to move the latter in a generally clockwise direction (FIG. 6) about pivot shaft 156 and thereby disengage hook 158 from edge 151, whereby cover 140 is free to pivot upwardly to its raised position under the influence of spring 148. It is thus seen that platform 82 and cover 140 are simultaneously raised from their first or horizontal positions to their raised positions upon movement of the actuator system 104 to facilitate removal of cassette 16 from the device.

It will be apparent that a relatively simple and inexpensive apparatus is provided for positioning and supporting a tape cassette in a predetermined positional relationship with the magnetic head of a recording and reproducing apparatus by means of shouldered support blocks 22, stud member 68 and resilient members 32 and 40 which maintain cassette 16 in engagement with surfaces 30 and shoulders 26 of support blocks 22 when carriage 14 and head 12 are moved to the recording and reproducing station. In addition, It is seen that the above described support system is readily adapted for use in conjunction with an ejection apparatus for lifting cassette 16 from support blocks 22 and stud member 68 and away from the recording and reproducing station for ready removal thereof from recording and reproducing apparatus.

While the above embodiment of the present invention has been described as being adapted to operate particularly in sound recording and reproducing tape cassettes, it is apparent that a cassette supporting and ejection device in accordance with the present invention may equally be adapted for use in video tape recording and reproducing apparatus. Further, although a particular illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A cassette tape recording and/or reproducing apparatus, comprising: a base plate; a carriage having at least one head thereon and being movably mounted on said base for movement parallel to the latter between first and second positions at which said head is disposed at an inactive station and at an operational station, respectively; supporting means including a pair of support members fixed on said base plate and having shouldered portions facing away from said base plate for receiving and supporting a first edge portion of a tape cassette extending adjacent said operational station at a predetermined level with respect to said head; a first resilient member mounted on said base plate for engaging the edge portion of said cassette which is opposite said first edge portion and urging the cassette toward said operational station and onto said shouldered portions; and a leaf-spring arm having one portion affixed to said carriage and having a free end that extends over, and bears downwardly on, said first edge portion of the cassette supported on said shouldered portion upon movement of the carriage to said operational station, whereby to ensure the exact positioning of the cassette with respect to said head when the latter is moved to said operational station, said free end of said arm being spaced above said first edge portion to allow said first edge portion to slide thereunder as said carriage moves from said inactive station to said active station, and the movement of said carriage to said inactive station for disposing said head at said inactive station being effective to withdraw said leaf-spring arm from over said first edge portion of a cassette on said shouldered portions so that said first edge portion of the cassette is free to be seated on, and removed from, said shouldered portions.

2. A cassette tape recording and/or reproducing apparatus according to claim 1, in which said leaf-spring arm is located laterally intermediate said pair of support members.

3. A cassette tape recording and/or reproducing apparatus according to claim 1 in which the other end of said leaf-spring arm is supported on said carriage and directed generally in the direction of movement of said carriage from said inactive station to said operative station, said free end of said leaf-spring arm is downwardly inclined toward its free extremity, and said extremity of said leaf-spring arm is upwardly curved to facilitate initial, sliding engagement thereof with the cassette.

* * * * *